(12) United States Patent
Wall (10) Patent No.: US 9,714,733 B2
(45) Date of Patent: Jul. 25, 2017

(54) CONNECTION DEVICE

(71) Applicant: ALPHA FRY LIMITED, Surrey (GB)

(72) Inventor: Richard Wall, Fetcham (GB)

( * ) Notice: Subject to any disclaimer, the term of this patent is extended or adjusted under 35 U.S.C. 154(b) by 1030 days.

(21) Appl. No.: 13/956,099

(22) Filed: Jul. 31, 2013

(65) Prior Publication Data

US 2014/0035272 A1  Feb. 6, 2014

(30) Foreign Application Priority Data

Aug. 2, 2012 (GB) .................... 1213773.3

(51) Int. Cl.
*F16L 37/14* (2006.01)
*F16L 37/56* (2006.01)
*F16L 39/00* (2006.01)

(52) U.S. Cl.
CPC ........... *F16L 37/144* (2013.01); *F16L 37/565* (2013.01); *F16L 39/00* (2013.01)

(58) Field of Classification Search
CPC ............................... F16L 37/565; F16L 37/144
USPC ....... 285/184, 280, 403, 404, 1, 90, 91, 282, 285/82, 321, 305
See application file for complete search history.

(56) References Cited

U.S. PATENT DOCUMENTS

| | | | | |
|---|---|---|---|---|
| 3,453,005 A | * | 7/1969 | Foults | F16L 37/088 137/583 |
| 3,574,359 A | * | 4/1971 | Klein | F16L 37/144 285/305 |
| 4,015,959 A | * | 4/1977 | Grote | B01D 53/26 55/318 |
| 7,506,897 B2 | * | 3/2009 | Bauer | F16L 37/088 285/305 |
| 7,874,595 B2 | * | 1/2011 | Lechner | F02M 37/0017 285/305 |
| 8,146,956 B2 | * | 4/2012 | Chaupin | F16L 37/088 285/305 |
| 8,678,443 B2 | * | 3/2014 | Bonhag | B25B 27/10 285/239 |

(Continued)

FOREIGN PATENT DOCUMENTS

DE  3242763 A1  5/1984
DE  19547829 A1  7/1997

(Continued)

*Primary Examiner* — Gregory Binda
*Assistant Examiner* — Zachary Dragicevich
(74) *Attorney, Agent, or Firm* — Carmody Torrance Sandak & Hennessey LLP (57) ABSTRACT

A connector is provided for connecting an auxiliary device to a fluid circulating system. The connector comprises a body with inlet and outlet ports for connection to the fluid circulating system, and an auxiliary port for connection to the auxiliary device. The auxiliary port diverts fluid from the inlet to the auxiliary device and returns fluid to the outlet port. A collar surrounds the auxiliary port, secured by two spring clips. When the spring clips are both locked, movement between the connector and auxiliary device is prevented. When the first clip is released and the second clip is locked, rotation between the connector and the auxiliary device about the central axis and a predetermined amount of movement along the axis is permitted. The connector can be fitted in a variety of orientations relative to the auxiliary device and angular adjustment is possible while the two remain connected and sealed.

12 Claims, 8 Drawing Sheets

(56) References Cited

U.S. PATENT DOCUMENTS

2007/0040380 A1    2/2007  Benstead
2009/0293242 A1  12/2009  Bithell et al.

FOREIGN PATENT DOCUMENTS

| | | |
|---|---|---|
| DE | 20105362 U1 | 8/2001 |
| DE | 20109986 U1 | 10/2001 |
| EP | 0086860 A1 | 8/1983 |
| KR | 100664876 B1 | 1/2007 |
| WO | 2007132996 A1 | 11/2007 |

* cited by examiner

CONNECTION DEVICE

CROSS-REFERENCE TO RELATED APPLICATION

This application claims the benefit under 35 U.S.C. §119 of United Kingdom Patent Application No. 1213773.3 filed on Aug. 2, 2012 which is hereby incorporated herein by reference in its entirety for all purposes.

FIELD OF THE TECHNOLOGY

The present invention is related to a connector for use in a fluid circulating system. The connector is particularly useful for connecting an auxiliary device, for example a filter as described in GB 2448232B, into a central heating system.

BACKGROUND

Where an auxiliary device such as the filter of GB 2448232 is used, an in-line connection is required which diverts fluid flow from existing pipework to the filter and then returns the flow to the existing pipework. The filter must be fitted in a substantially vertical orientation. However, the relative position and orientation of the existing pipework may vary and access may be restricted. Therefore, providing a connector to divert the flow to the auxiliary device can be awkward.

SUMMARY

The present invention provides a connector for connecting an auxiliary device to a fluid circulating system, the connector comprising a body having an inlet port and an outlet port suitable for connection to the fluid circulating system, and an auxiliary port for connection to the auxiliary device, the auxiliary port defining a central axis and arranged to divert fluid from the inlet port to the auxiliary device and to return fluid from the auxiliary device to the outlet port, a collar surrounding the auxiliary port, and first and second releasable locking means operable to secure the collar to the auxiliary device, wherein when the first and second locking means are locked relative movement between the connector and the auxiliary device is prevented, and when the first locking means is released and the second locking means is locked, relative rotation between the connector and the auxiliary device about the axis, and a predetermined amount of relative movement between the connector and the auxiliary device along the axis, are permitted.

Preferably, the body further comprises seal means operable to form a seal between the connector and the auxiliary device when the first and second locking means are locked, and when the first locking means is released and the second locking means is locked.

Preferably, the first and second locking means each comprise a resilient member locatable on the collar and releasably engageable with the auxiliary device.

Preferably, the collar defines a plurality of apertures through which portions of the resilient locking members pass so as to be engageable with the auxiliary device.

Preferably, the collar further defines a plurality of circumferential grooves, each including at least one aperture, and where in each locking means comprises a spring clip locatable in the respective groove.

Preferably, each groove extends less than 360° around the collar and the grooves are angularly offset from one another.

Preferably, the ends of the grooves are shaped to receive correspondingly shaped end portions of the locking means.

Preferably, a ramp formation is formed adjacent the ends of the groove receiving the first locking means, over which the ends of the locking means pass when the locking means is moved orthogonal to the axis in order to release it.

Preferably, the collar further defines a recess adjacent to the groove containing a first locking means to facilitate access to the locking means for releasing it.

Preferably, an array of engagement structures is formed on the body defining a plurality of alternate peaks and troughs selectively engageable with a corresponding array of engagement structures on an auxiliary device at a plurality of orientations about the axis.

Preferably, the engagement structures are configured such that they are in mating engagement with the auxiliary device when the first and second locking means are locked and are rotatable relative to one another about the axis when the first locking means is released.

The present invention also provides a connector as set out above in combination with an auxiliary device.

Preferably, the auxiliary device defines a port for connection to the auxiliary port of the connector and structures to receive the first and second locking means, wherein the structure to receive the second locking means allows axial movement of the second locking means to a predetermined extend when the first locking means is released.

Preferably, the structures to receive the first and second locking means comprise grooves in the auxiliary device.

The invention will now be described in detail, by way of example only, with reference to the accompanying drawings in which:

DETAILED DESCRIPTION

Figure 1:
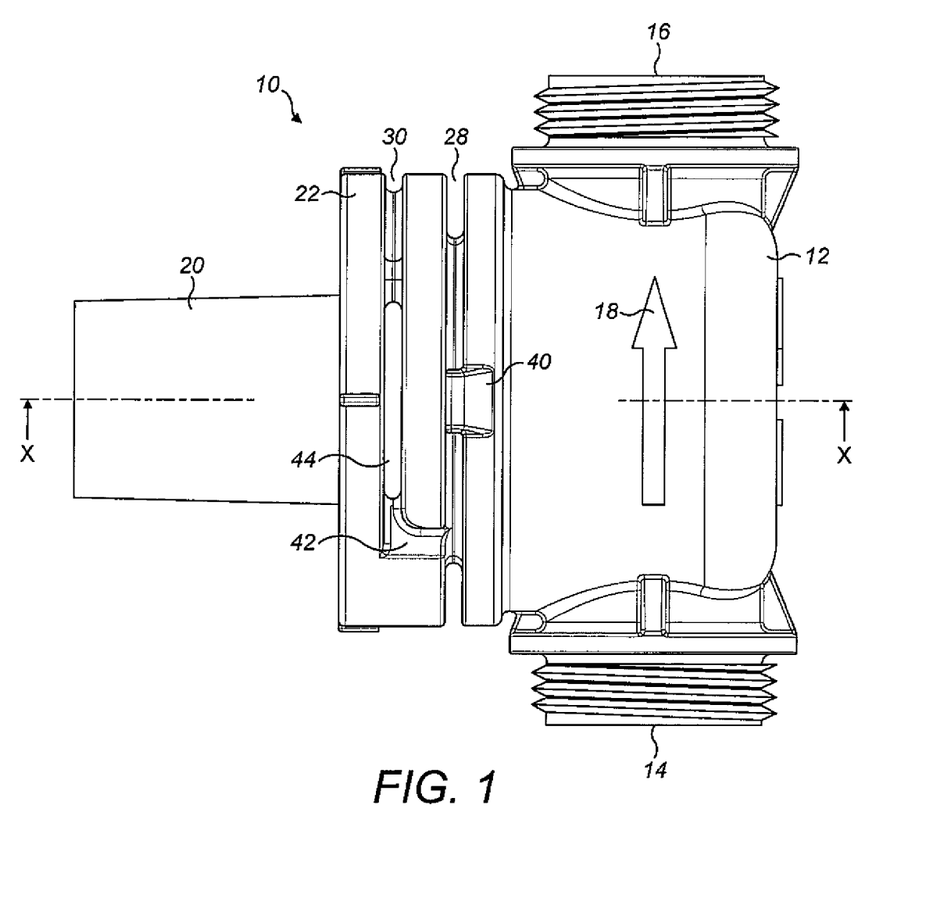
FIG. 1 is a front view of a connector in accordance with one embodiment of the present invention.

A connector 10 in accordance with the present invention comprises a main body 12 with an inlet port 14 and an outlet port 16. As shown in FIG. 1, the inlet port 14 and outlet port 16 may be provided with threaded connections for attachment to existing pipework. For convenience, the main body 12 may be formed with some form of marking 18, such as the arrow illustrated, to show the overall flow direction and facilitate fitting.

Figure 2:
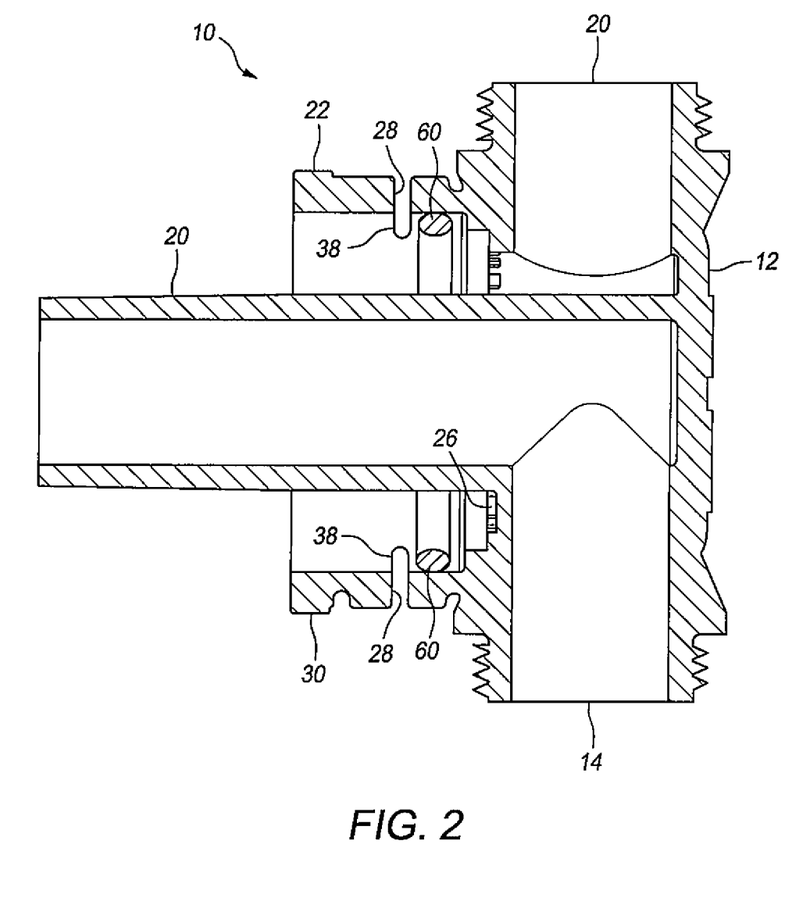
FIG. 2 is a cross section of the connector of FIG. 1.

Within the main body 12, as shown in FIG. 2, the inlet port 14 is connected to a conduit 20 which will divert incoming flow by substantially 90° towards an auxiliary device 46, as described further below. The conduit 20 has a central axis XX as illustrated.

A collar 22 extends from the body 12 coaxially with the conduit 20 for connection to the auxiliary device 46. An annular channel 24 is formed between the collar 22 and the conduit 20 which provides a return channel for fluid exiting the auxiliary device 46. The channel 24 is in communication with the outlet port 16 to return fluid flow back to the existing pipework.

Figure 5:
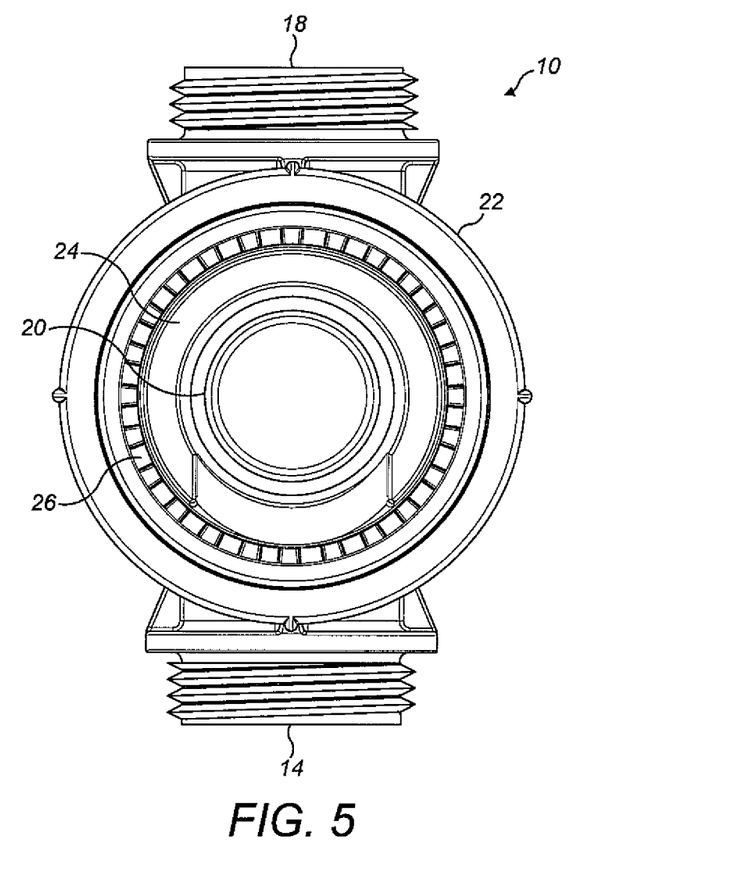
FIG. 5 is a left hand side view of the connector of FIG. 1.

Within the collar 22 and surrounding the conduit 20, the main body 12 is provided with an annular array of engagement structures, such as castellations 26 for engagement with a corresponding array on the auxiliary device 46. This is best seen in FIGS. 2 and 5. While regular castellations are shown, the engagement structures may take alternative forms providing a plurality of alternating peaks and troughs.

The outer surface of the collar 22 is provided with two circumferential grooves 28, 30. Both grooves extend only part of the way around the collar 22, typically about 270°. The two grooves 28, 30 are offset with one another so that the non-grooved portion between the ends of one groove 28 is offset by approximately 90° relative to the non-grooved portion between the ends of the other groove 30.

Figure 3:
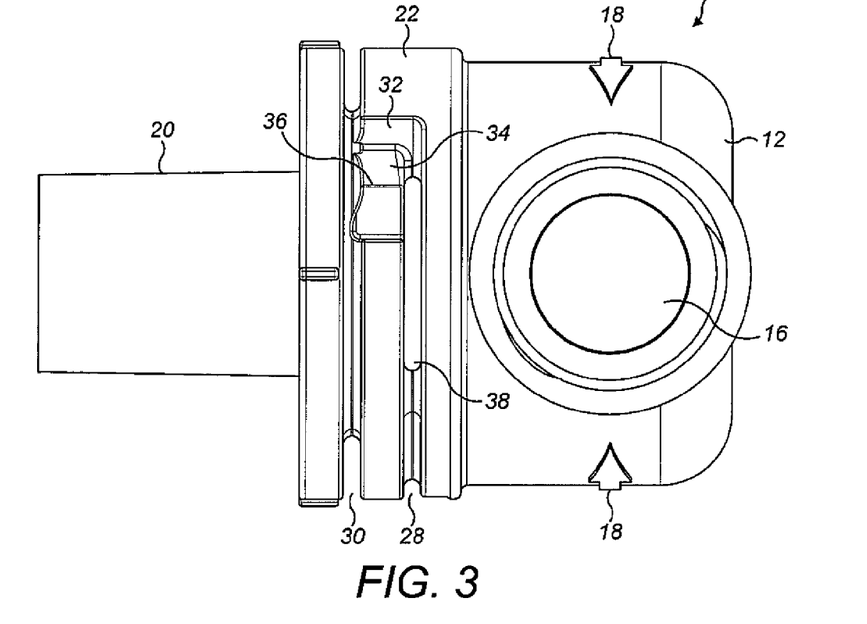
FIG. 3 is a top view of the connector of FIG. 1.
Figure 4:
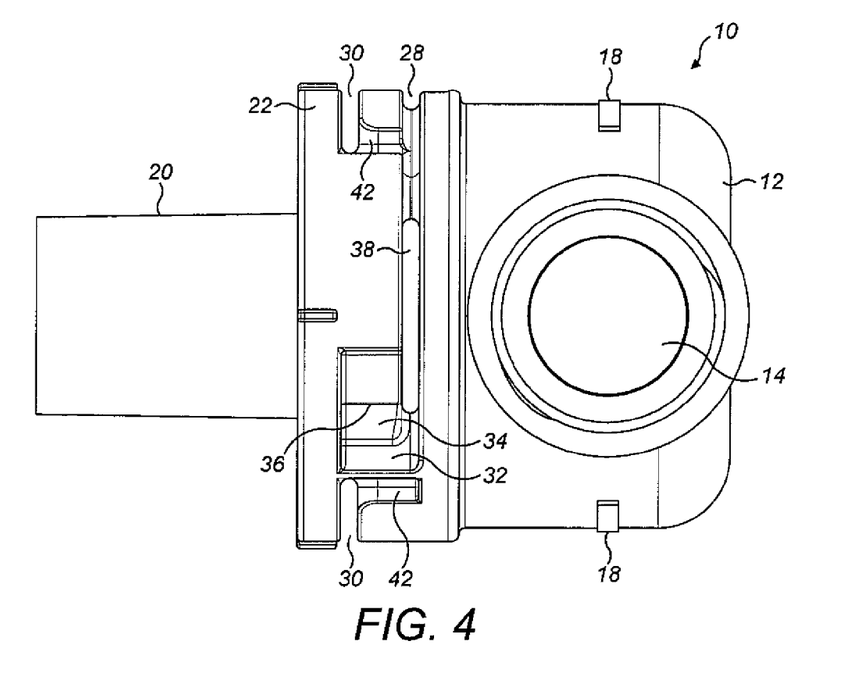
FIG. 4 is a bottom view of the connector of FIG. 1.

The proximal groove 28 which is closest to the body 12 includes L-shaped end portions 32 best seen in FIGS. 3 and 4. A ramp feature 34 is provided adjacent to each L-shaped end portion 32. The ramp 34 provides an upward slope from the base of the groove 28 to a crest 36 and then slopes downwardly again.

An elongate aperture 38 is formed through the collar 22 in the base of the groove 28 adjacent to each L-shaped end portion 32, as also seen in FIGS. 3 and 4.

Figure 6:
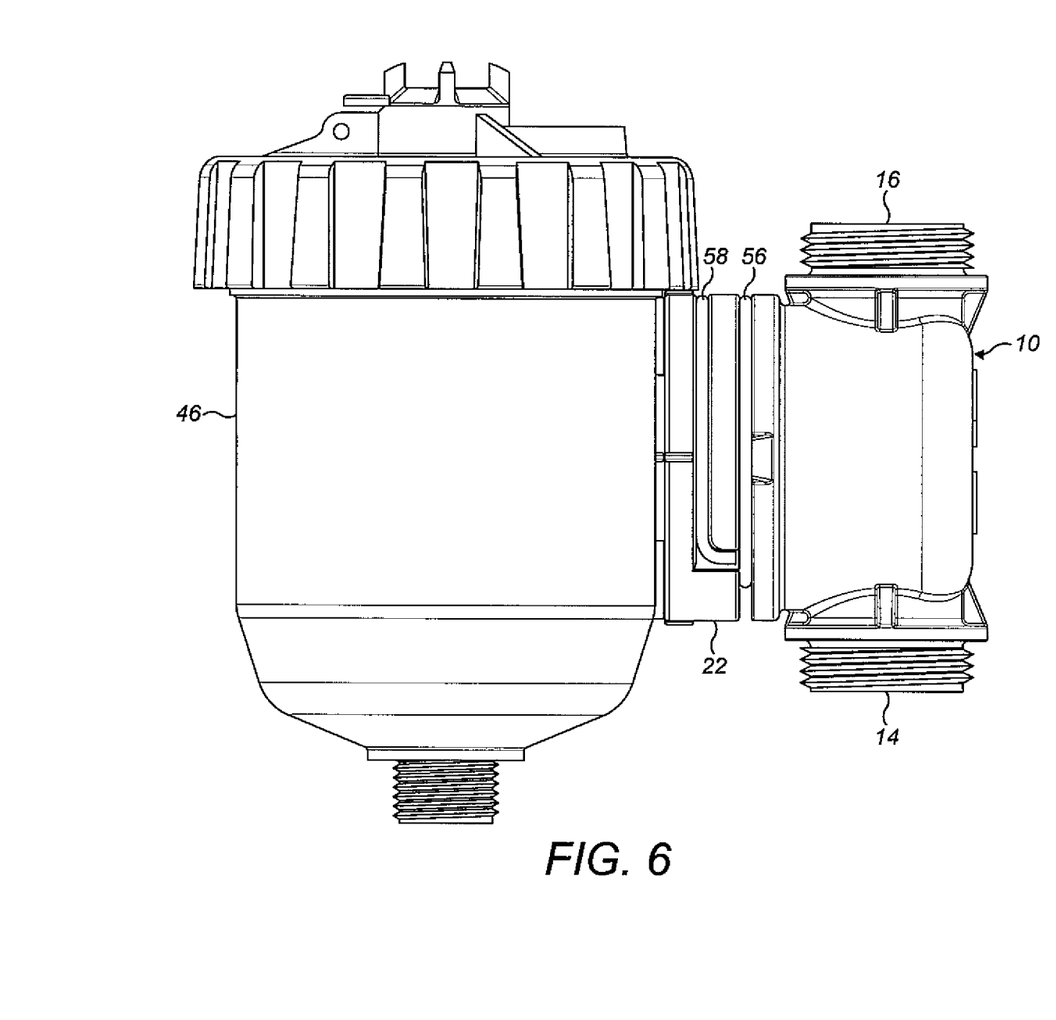
FIG. 6 is a front view of the connector of FIG. 1 attached to an auxiliary device.
Figure 7:
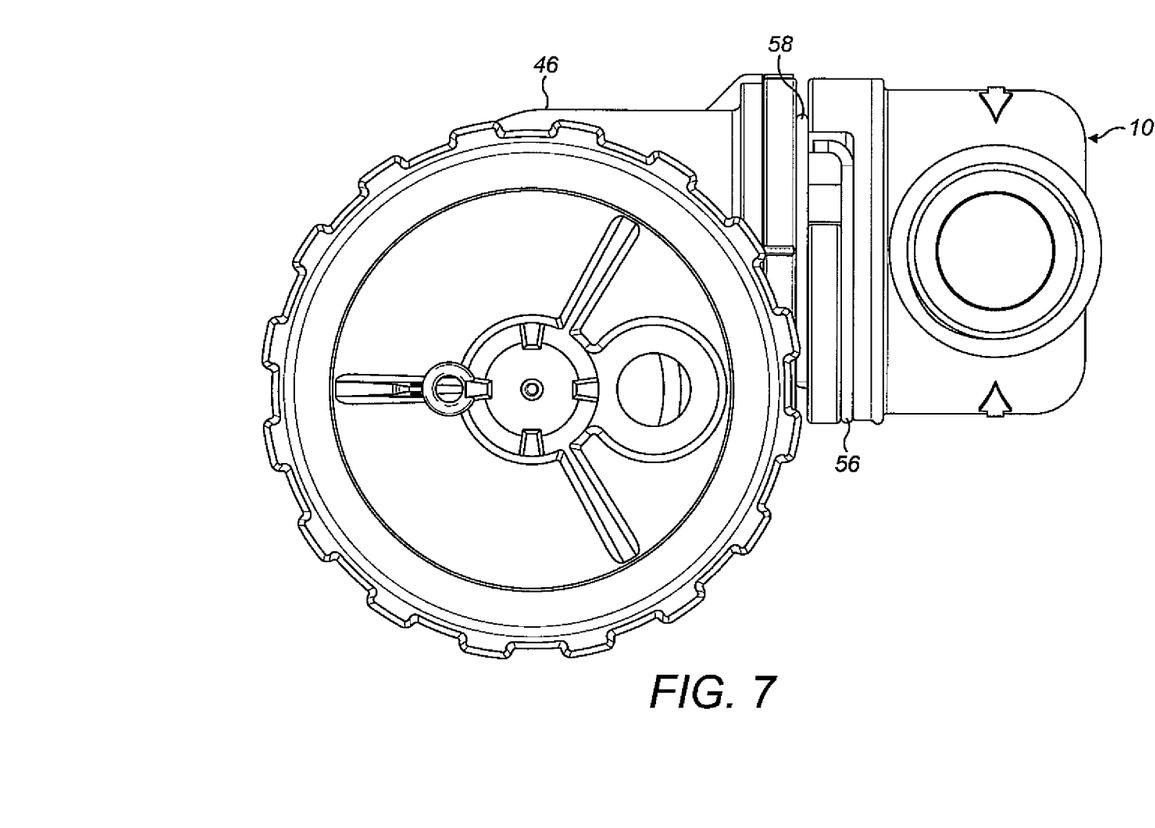
FIG. 7 is a top view of FIGS. 6.

As seen in FIGS. 1 and 6, at a mid-point of the proximal groove 28, a recess 40 is provided adjacent and extending into the groove 28 itself.

The distal groove 30 furthest from the body 12 also includes L-shaped end portions 42 at each end, as seen in FIGS. 1 and 4, although it does not have the ramp features. The distal groove 30 is also provided with an elongate aperture 44 adjacent to each L-shaped end portions 42. Once such aperture 44 is shown in FIG. 1, the other is on the opposite side of the connector 10.

Figure 8:
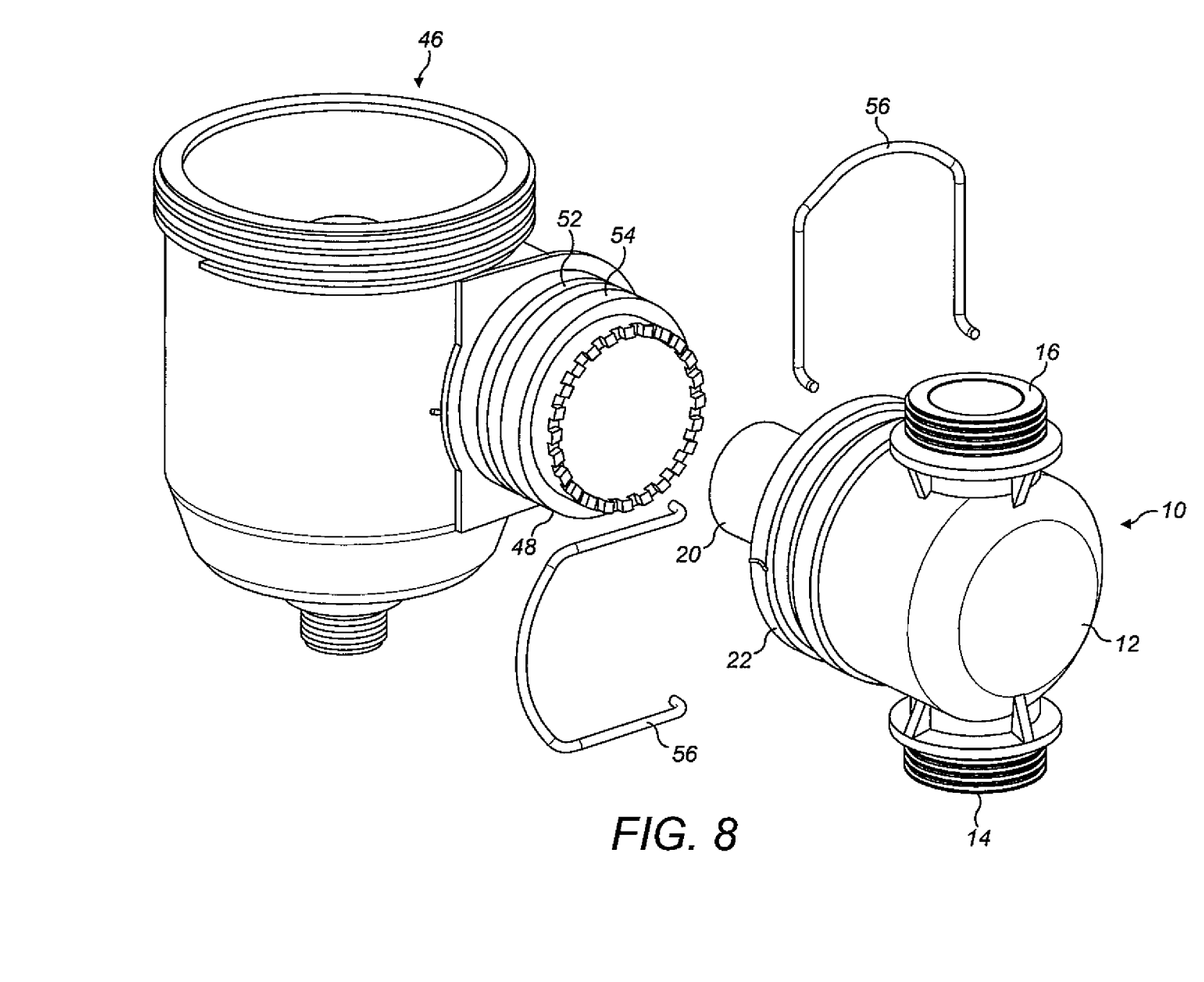
FIG. 8 is an exploded perspective view of FIG. 6 (with the lid part of the auxiliary device omitted).
Figure 9:
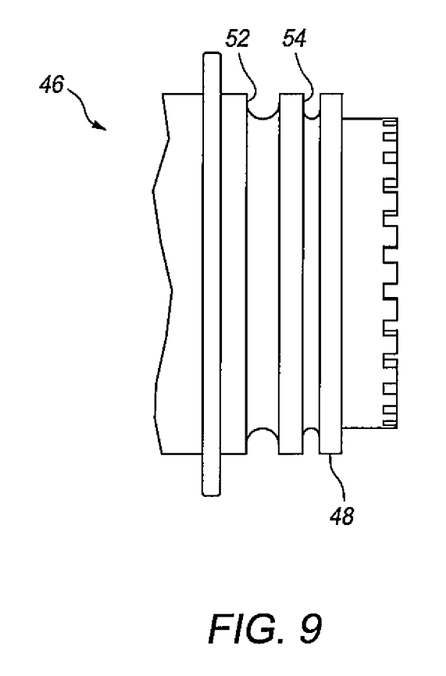
FIG. 9 is a side view of the boss shown in FIG. 8.

As shown in FIG. 8, an auxiliary device 46 is formed with a cylindrical boss 48 to receive and mate with the connector 10. The boss 48 is received in the annular channel 24 between the conduit 20 and the collar 22. The free end of the boss 48 is formed with an annular array of castellations 50 configured to mate with the castellations 26 formed on the connector 10.

The outer surface of the boss 48 is formed with two circumferential grooves 52, 54. The width of the proximal groove 52 closest to the main body of the auxiliary device 46 is wider than, and preferably approximately twice the width of, the distal groove 54 which is furthest from the auxiliary device 46.

In use, the connector 10 and boss 48 are brought into contact, with the respective castellations 26, 50 engaging with each other. The castellations 26, 50 permit the connector 10 to be rotated and engage with the boss 48 at a plurality of different orientations. Thus, the auxiliary device 46 can be maintained in the desired orientation, e.g. substantially vertical, whilst the connector 10 may be fitted vertically as shown, if that is convenient, or rotated to a number of other angular positions in order to best fit with the existing pipework.

When the castellations 26, 50 are engaged, the grooves 28, 30 in the collar 22 overlie the grooves 52, 54 formed in the boss 48. To secure the connector 10 in place, releasable locking devices such as spring clips 56, 58 are fitted into the grooves 28, 30 of the collar 22. As shown in FIG. 8, each spring clip 56, 58 is substantially U-shaped, and bent over at each end so that the ends will sit in the L-shaped end portions 32 and 42 of the grooves 28, 30 in the collar 22. Due to the elongate apertures 38, 44 formed in the grooves 28, 30, portions of the straight arms of each U-shaped clip 56, 58 will sit within portions of the grooves 52, 54 in the boss 48. Thus, the connector 10 becomes locked to the auxiliary device 46.

A seal 60, for example in the form of an O-ring, is provided between the connector 10 and the auxiliary device 46. The location of the seal 60 is shown in FIG. 2. In use, the seal 60 is located between the interior surface of the collar 22, proximal of both grooves 28, 30, and the exterior surface of the boss 48, distal of the grooves 52, 54. The seal 60 prevents fluid leaking at the interface of the connector 10 and the auxiliary device 46.

In use, in order to fit or adjust the position of the connector 10 relative to the auxiliary device 46, a tool such as a screw driver is inserted into the recess 40 and used to lever the first spring clip 56 out of the groove 28. As the spring clip 56 is urged away from the collar 22, i.e. in a direction out of the plane of the diagram in FIG. 1, the ends of the clip 56 are pulled up and over the crest 36 of the ramped portion 34. Thus, the ramped portion 34 prevents the clip 56 being unintentionally removed, but when the clip 56 is levered up by a tool inserted in the recess 40, the ramped portion 34 causes the clip 56 to open up to disengage is and prevents the clip 56 springing back into place unintentionally.

Once levered out, the arms of the first spring clip 56 no longer lie within the groove 54 of the boss 48. The arms of the second spring clip 58 still lie within the proximal groove 52 of the boss 48 through the elongate apertures 44, but because this groove 52 in the boss 48 is wider than the other groove 54, it allows the auxiliary device 46 and connector 10 to move to a small extent away from one another along the axis XX of the conduit 20 and collar 22. This disengages the arrays of castellations 26, 50 and allows adjustment of the relative orientation of the connector 10 and the auxiliary device 46 around the axis. Once in a desired position, the auxiliary device 46 and the connector 10 can be moved towards each other again along the axis XX, reengaging the arrays of castellations 26, 50 in a new relative position. The spring clip 56 can then be pushed back into position within the proximal groove 28, so that parts of its arms once again reside in parts of the groove 54 in the boss 48. This locks the connector 10 back in place and prevents further axial or rotational movement.

Whilst such adjustment is carried out, the O-ring seal 60 remains in sealing contact with the collar 22 and the boss 48. Therefore, no fluid leakage occurs and the adjustment may be carried out at full system pressure.

Thus, the present invention provides an improved connector for connecting an auxiliary device to a fluid circulating system. The connector can be fitted in a variety of orientations relative to the auxiliary device. Furthermore, the connector allows angular adjustment relative to the auxiliary device while the two are still connected and sealed. Therefore, adjustment can be carried out with fluid present in the system and at normal system pressure. It will be appreciated that the precise details of the connector can be varied from those shown and described herein.

What is claimed is:

1. A connector for connecting an auxiliary device to a fluid circulating system, the connector comprising:
    a body having an inlet port and an outlet port suitable for connection to the fluid circulating system,
    an auxiliary port suitable for connection to the auxiliary device, wherein the auxiliary port defines a central axis and is arranged to divert fluid through a conduit from the inlet port to the auxiliary device and to return fluid through a return channel from the auxiliary device to the outlet port of the body, a collar surrounding the auxiliary port, and first and second releasable locking spring clips operate to secure the collar to the auxiliary device, wherein when the first and second spring clips are locked, relative movement between the connector and the auxiliary device is prevented, and when the first spring clip connector and the auxiliary device about the axis, and a predetermined amount of relative movement between the connector and the auxiliary device along the axis is permitted.

2. A connector as claimed in claim 1, wherein the body further comprises a seal that prevents leaking at the interface between the connector and the auxiliary device when the first and second spring clips are locked, and when the first spring clip is released and the second spring clip is locked.

3. A connector as claimed in claim 1, wherein the collar comprises a plurality of apertures through which portions of the spring clips pass so as to be engageable with the auxiliary device.

4. A connector as claimed in claim 3, wherein the collar further defines a plurality of circumferential grooves, each including at least one aperture, and where in each spring clip sits within a groove.

5. A connector as claimed in claim 4, wherein each groove extends less than 360° around the collar and the grooves are angularly offset from one another.

6. A connector as claimed in claim 5, wherein the ends of the grooves are shaped to receive correspondingly shaped end portions of the spring clips.

7. A connector as claimed in claim 6, further comprising a ramp formation adjacent to the ends of the groove receiving the first spring clip, over which the ends of the spring clip pass when the spring clip is moved orthogonal to the axis in order to release it.

8. A connector as claimed in claim 7, wherein the collar further defines a recess adjacent to the groove containing the first releasable locking spring clip to facilitate access to the spring clip for releasing it.

9. A connector as claimed in claim 1, further comprising an array of engagement structures on the body defining a plurality of alternate peaks and troughs selectively engageable with a corresponding array of engagement structures on an auxiliary device at a plurality of orientations about the axis.

10. A connector as claimed in claim 9, wherein the engagement structures are configured such that they are in mating engagement with the auxiliary device when the first and second spring clips are locked and are rotatable relative to one another about the axis when the first spring clip is released.

11. A connector and auxiliary device combination as claimed in claim 1, wherein the auxiliary device defines a port for connection to the auxiliary port of the connector and structures to receive the first and second spring clip, wherein the structures to receive the second spring clip allow axial movement of the second spring clip to a predetermined extent when the first spring clip is released.

12. A connector and auxiliary device combination as claimed in claim 11, wherein the structures to receive the first and second spring clips comprise grooves in the auxiliary device.

* * * * *